US008217894B2

(12) United States Patent  (10) Patent No.: US 8,217,894 B2
Choi  (45) Date of Patent: Jul. 10, 2012

(54) DTV CAPABLE OF RECEIVING SIGNAL FROM 3D POINTING DEVICE, AND METHOD OF EXECUTING FUNCTION AND ADJUSTING AUDIO PROPERTY OF DTV EMPLOYING 3D POINTING DEVICE

(75) Inventor: Go Woon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 707 days.

(21) Appl. No.: 12/206,530

(22) Filed: Sep. 8, 2008

(65) Prior Publication Data
US 2009/0295719 A1   Dec. 3, 2009

(30) Foreign Application Priority Data

Jun. 3, 2008  (KR) .................... 10-2008-0051930
Aug. 12, 2008  (KR) .................... 10-2008-0078849

(51) Int. Cl.
*G09G 5/08* (2006.01)
*G06F 3/033* (2006.01)
(52) U.S. Cl. ......... 345/158; 345/156; 345/159; 348/734
(58) Field of Classification Search .................. None
See application file for complete search history.

(56) References Cited

U.S. PATENT DOCUMENTS

| | | | | |
|---|---|---|---|---|
| 6,307,536 B1* | 10/2001 | Hada | | 345/159 |
| 6,603,420 B1* | 8/2003 | Lu | | 341/176 |
| 7,123,180 B1* | 10/2006 | Daniell et al. | | 341/176 |
| 7,233,316 B2* | 6/2007 | Smith et al. | | 345/157 |
| 7,679,601 B2* | 3/2010 | Chang et al. | | 345/156 |
| 2002/0068556 A1* | 6/2002 | Brown | | 455/420 |
| 2003/0142065 A1* | 7/2003 | Pahlavan | | 345/156 |
| 2006/0250358 A1* | 11/2006 | Wroblewski | | 345/157 |
| 2008/0265143 A1 | 10/2008 | Peters | | |
| 2009/0153389 A1* | 6/2009 | Kerr et al. | | 341/176 |

FOREIGN PATENT DOCUMENTS

| | | |
|---|---|---|
| KR | 10-2007-0007951 A | 1/2007 |
| KR | 10-2007-0043807 A | 4/2007 |
| WO | WO 2004/047011 A2 | 6/2004 |

* cited by examiner

*Primary Examiner* — Nitin Patel
*Assistant Examiner* — Christopher Thompson
(74) *Attorney, Agent, or Firm* — Birch, Stewart, Kolasch & Birch, LLP

(57) ABSTRACT

A system and method for controlling a digital TV, the system including the DTV; and a 3D pointing device. The DTV includes a receiver to receive control signals from the 3D pointing device; and a control unit to select one of a plurality of functions provided by the DTV in response to a selection signal received from the 3D pointing device, each function having a corresponding execution profile, and execute the selected function in accordance with the corresponding execution profile and a motion parameter sensed by the 3D pointing device including a direction of movement and one of a distance and velocity corresponding to the direction of movement. The 3D pointing device includes a transmitter to transmit the control signals and motion parameter; and a sensor to sense within the 3D pointing device the motion of the 3D pointing device and generate the corresponding motion parameter.

33 Claims, 12 Drawing Sheets

DTV CAPABLE OF RECEIVING SIGNAL FROM 3D POINTING DEVICE, AND METHOD OF EXECUTING FUNCTION AND ADJUSTING AUDIO PROPERTY OF DTV EMPLOYING 3D POINTING DEVICE

CROSS REFERENCES TO RELATED APPLICATIONS

This nonprovisional application claims priorities under 35 U.S.C. §119(a) on Patent Application No. 10-2008-0051930 filed in Republic of Korea on Jun. 3, 2008 and Application No. 10-2008-0078849 filed in Republic of Korea on Aug. 12, 2008 the entire contents of which are hereby incorporated by references.

BACKGROUND OF THE INVENTION

1. Field of the Invention

This document relates to digital television (DTV) that is able to receive signals from a three-dimensional (3D) pointing device, and more particularly, to DTV that is able to receive signals from a 3D pointing device, which can vary an execution speed according to the degree of motion of the 3D pointing device, in executing functions of DTV in response to the motion of the 3D pointing device, a method of executing the functions of DTV by employing the 3D pointing device, and a method of adjusting the audio properties of DTV by employing the 3D pointing device.

2. Discussion of the Related Art

Currently, active research has been done on a 3D pointing device or a 3D remote controller employing a gyro sensor or an accelerometer. However, despite that electronic devices, being controlled by the 3D pointing device, are quite numerous, development on applications regarding the electronic devices is insufficient.

In recent years, DTV has become providing a variety of functions such as reception of analog or digital broadcasting, reception of electronic program guide (EPG), bi-directional communication, and Internet access. DTV also has become responsible for the functions of a server in home network environment or ubiquitous environment.

As DTV has been able to perform a lot of the functions, items that should be controlled by a user have increased and become complicated. Thus, there is a problem that a remote controller of an existing infrared communication method cannot control the complicated functions efficiently.

To solve the problem, the remote controller of an existing infrared communication method can be replaced with the 3D pointing device. However, research on how DTV can be controlled efficiently using the 3D pointing device has not been done sufficiently. In particular, there is an urgent need for development where the device characteristics of the 3D pointing device, being able to sense 3D motion, can be efficiently employed in DTV.

SUMMARY OF THE INVENTION

An aspect of this document is to provide DTV that is able to receive signals from a 3D pointing device, which can vary an execution speed of functions provided from the DTV according to the degree of motion of the 3D pointing device, a method of executing the functions of DTV by employing the 3D pointing device, and a method of adjusting the audio properties of DTV by employing the 3D pointing device.

Another aspect of this document is to provide DTV that is able to receive signals from a 3D pointing device, which can sense 3D motion and whose device characteristics can be used to control DTV effectively, a method of executing the functions of DTV by employing the 3D pointing device, and a method of adjusting the audio properties of DTV by employing the 3D pointing device.

In an aspect of this document, there is a method of executing functions of DTV by employing a 3D pointing device, wherein the DTV can receive signals from the 3D pointing device that recognizes 3D motion, the method comprising selecting a function provided by the DTV, sensing motion of the 3D pointing device, and executing the selected function, wherein an execution speed of the selected function is controlled according to a degree of the sensed motion.

The method may further comprise entering a recognition mode for recognizing the motion of the 3D pointing device according to a user's manipulation on the 3D pointing device, before the motion of the 3D pointing device is sensed.

The execution of the selected function may comprise controlling the execution speed in consideration of at least one of the selected function itself, a distance of the sensed motion, and a speed of the sensed motion.

The execution of the selected function may comprise controlling the execution speed in consideration of a current value regarding the selected function.

The execution of the selected function may comprise controlling the execution speed in consideration of a direction of the sensed motion, wherein an increment and decrement of a value regarding the selected function may be previously set according to the direction of the sensed motion.

The selected function may comprise a function for controlling an output state of information. Here, the selected function may comprise a volume control function of audio information or a picture quality control function of video information.

The execution speed can be set by a user.

In another aspect of this document, there is a method of executing functions of DTV by employing a 3D pointing device, wherein the DTV can receive signals from the 3D pointing device that recognizes 3D motion, the method comprising executing a first function at a first response speed with respect to motion of the 3D pointing device, selecting a second function different from the first function, and executing the second function at a second response speed different from the first response speed with respect to the motion of the 3D pointing device.

The method may further comprise entering a recognition mode for recognizing the motion of the 3D pointing device according to a user's manipulation on the 3D pointing device.

The first and second response speeds may have different values although at least one of a distance of the motion of the 3D pointing device, a speed of the motion of the 3D pointing device, and a direction of the motion of the 3D pointing device is identical.

The first and second response speeds may be decided in consideration of at least one of a corresponding function itself and a current value regarding the corresponding function.

The first and second response speeds can be set by a user.

In still another aspect of this document, there is a method of adjusting audio properties of DTV by employing a 3D pointing device, wherein the DTV can receive signals from the 3D pointing device that recognizes 3D motion, the method comprising outputting audio through an audio output device, selecting a specific one of one or more functions for controlling the audio properties, sensing motion of the 3D pointing device, and executing the selected specific function, while varying a change speed of a value regarding the specific function, in consideration of a current value regarding the sensed motion and the specific function.

The method may further comprise entering a recognition mode for recognizing the motion of the 3D pointing device according to a user's manipulation on the 3D pointing device.

The specific function may comprise a volume control function or a tone control function.

In the execution of the specific function, an increment and decrement of a value regarding the specific function may be previously set according to a direction of the sensed motion, and the value regarding the specific function is changed according to the direction of the sensed motion.

The change speed of the value regarding the specific function can be set by a user.

In still another aspect of this document, there is a DTV capable of receiving signals from a 3D pointing device that recognizes 3D motion, the DTV comprising a reception unit for receiving a radio signal from the 3D pointing device, and a controller for receiving the radio signal from the 3D pointing device through the reception unit, sensing motion of the 3D pointing device, and controlling an execution speed of a function provided by the DTV according to a degree of the sensed motion.

The controller may enter a recognition mode for recognizing the motion of the 3D pointing device according to a user's manipulation on the 3D pointing device.

The controller may control the execution speed in consideration of at least one of the function itself, a distance of the sensed motion, and a speed of the sensed motion.

The controller may control the execution speed in consideration of a current value regarding the function.

The controller may control the execution speed in consideration of a direction of the sensed motion, wherein an increment and decrement of a value regarding the function are previously set according to the direction of the sensed motion.

The function may comprise a function for controlling an output state of information. Here, the function may comprise a an audio quality control function (e.g., volume, balance, bass, treble, etc.) or a picture quality control function (e.g., brightness, tint, color, contrast, saturation, sharpness, etc.).

The execution speed can be set by a user.

In further still another aspect of this document, there is a DTV capable of receiving signals from a 3D pointing device that recognizes 3D motion, the DTV comprising a reception unit for receiving a radio signal from the 3D pointing device, and a controller for executing various functions provided by the DTV, receiving a radio signal from the 3D pointing device through the reception unit, and sensing motion of the 3D pointing device. In the case in which a second function different from a first function is selected while the first function is executed at a first response speed with respect to the motion of the 3D pointing device, the controller executes the second function at a second response speed different from the first response speed with respect to the motion of the 3D pointing device.

The controller may enter a recognition mode for recognizing the motion of the 3D pointing device according to a user's manipulation on the 3D pointing device.

The first and second response speeds can have different values although at least one of a distance of the motion of the 3D pointing device, a speed of the motion of the 3D pointing device, and a direction of the motion of the 3D pointing device is identical.

The first and second response speeds may be decided in consideration of at least one of a corresponding function itself and a current value regarding the corresponding function.

The first and second response speeds can be set by a user.

In further still another aspect of this document, there is a DTV capable of receiving signals from a 3D pointing device that recognizes 3D motion, the DTV comprising a reception unit for receiving a radio signal from the 3D pointing device, and a controller for executing various functions provided by the DTV, receiving a radio signal from the 3D pointing device through the reception unit, and sensing motion of the 3D pointing device. In the case in which a specific one of one or more functions for controlling audio properties is selected, the controller executes the specific function, while varying a change speed of a value regarding the specific function, in consideration of the motion of the 3D pointing device and a current value regarding the specific function.

The controller may enter a recognition mode for recognizing the motion of the 3D pointing device according to a user's manipulation on the 3D pointing device.

The specific function may comprise an audio quality control function (e.g., volume, balance, bass, treble, etc.) or a picture quality control function (e.g., brightness, tint, color, contrast, saturation, sharpness, etc.)

The controller may vary the change speed of the value regarding the specific function according to a direction of the sensed motion, wherein an increment and decrement of the value regarding the specific function are previously set according to the direction of the sensed motion.

The change speed of the value regarding the specific function can be set by a user.

BRIEF DESCRIPTION OF THE DRAWINGS

The implementation of this document will be described in detail with reference to the following drawings in which like numerals refer to like elements.

DETAILED DESCRIPTION OF THE INVENTION

The above objects, specific merits and novel characteristics of this document will become more apparent from the following detailed description taken in conjunction with the accompanying drawings. Hereinafter, implementations of this document will be described in detail with reference to the attached drawings. The same reference numbers will be used throughout the drawings and specification to refer to the same or like parts. Further, in describing this document, detailed description on the known functions and constructions will be omitted if it is determined to make the gist of this document unnecessarily vague.

Figure 1:
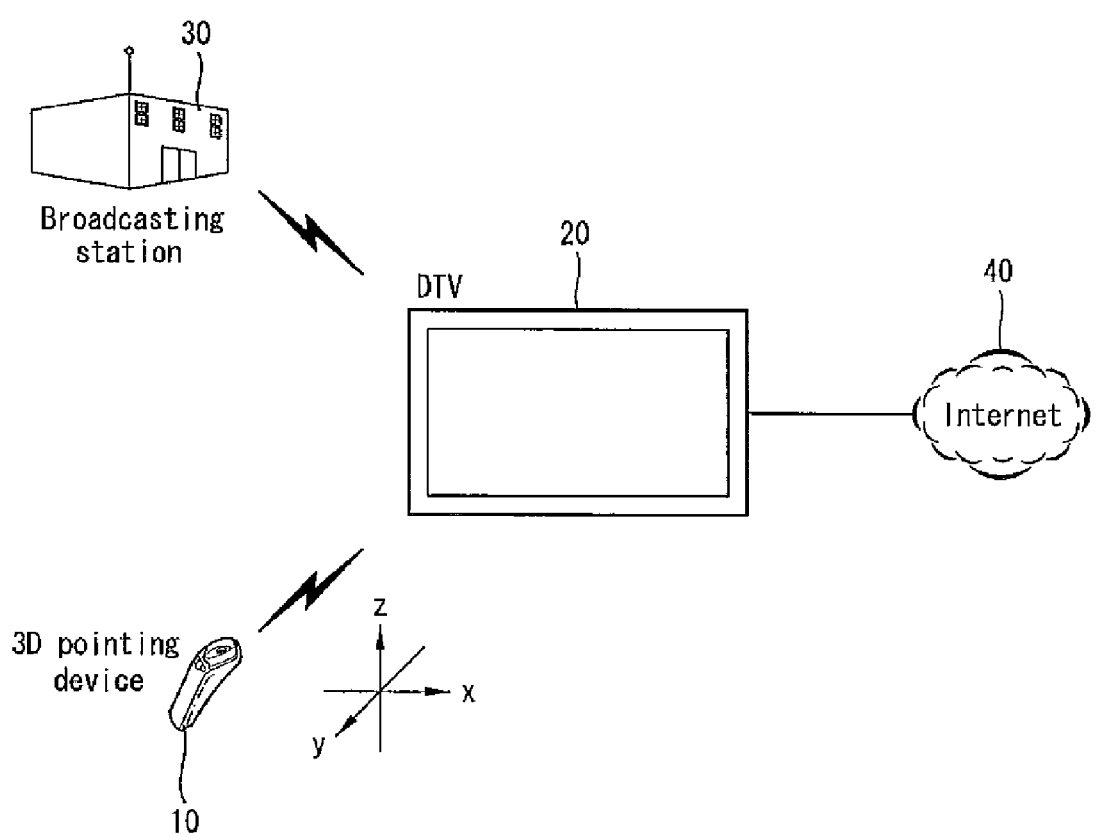
FIG. 1 is a diagram schematically showing a system to which this document is applied.

FIG. 1 is a diagram schematically showing a system to which this document is applied. This document, as shown in FIG. 1, can be applied to a system comprising a 3D pointing device 10 and DTV 20.

The 3D pointing device 10 can sense 3D motion and transmit information about the sensed 3D motion to the DTV 20. The 3D motion can correspond to commands for controlling the DTV 20. A user can transfer a specific command to the DTV 20 by moving the 3D pointing device 10 on the space. The 3D pointing device 10 can be equipped with various key buttons. A user can input a variety of commands through the key buttons.

The DTV 20 can receive a broadcasting signal from a broadcasting station 30 and output the received broadcasting signal. Further, the DTV 20 can comprise an apparatus that can be connected to an Internet 40 according to the transmission control protocol/Internet protocol (TCP/IP).

Figure 2A:
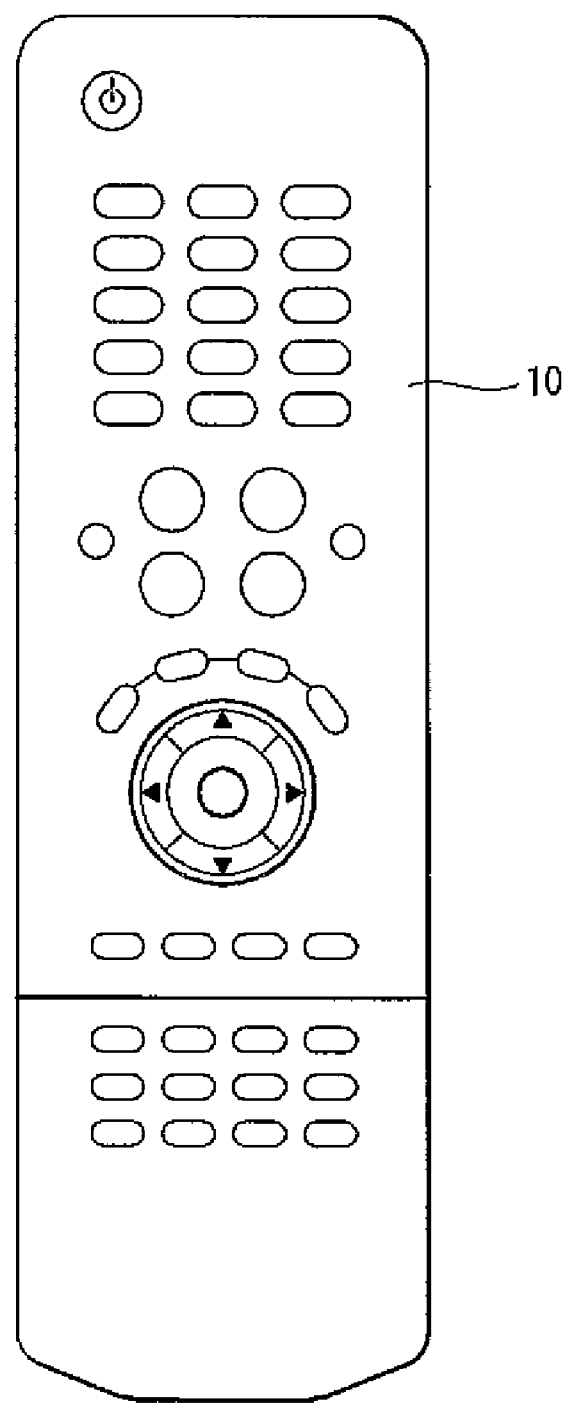
FIG. 2a is a diagram showing an exemplary external shape of a 3D pointing device 10 in accordance with an embodiment of this document.
Figure 2B:
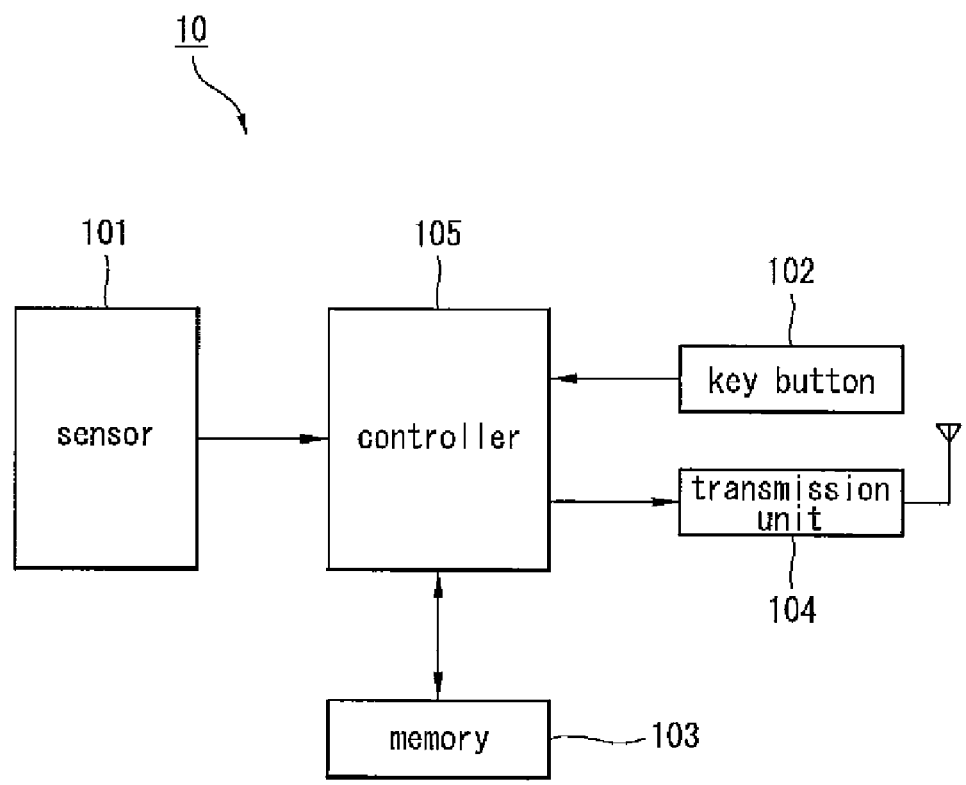
FIG. 2b is a block diagram showing the construction of the 3D pointing device 10 in accordance with an embodiment of this document.

FIG. 2a is a diagram showing an exemplary external shape of the 3D pointing device 10 in accordance with an embodiment of this document. FIG. 2b is a block diagram showing the construction of the 3D pointing device 10 in accordance with an embodiment of this document. The 3D pointing device 10 in accordance with an embodiment of this document is described in detail below with reference to FIGS. 2a and 2b.

The 3D pointing device 10 in accordance with an embodiment of this document can comprise a sensor 101, a key button 102, memory 103, a transmission unit 104, and a controller 105.

The sensor 101 senses 3D motion of the 3D pointing device 10. The sensor 101 can comprise at least one of a gyro sensor, a gravity sensor, an inertia sensor, a geomagnetic sensor, and an accelerometer and can sense 3D motion of the 3D pointing device 10 by employing one of the sensors or through a combination of two or more of the sensors.

The key button 102 is an apparatus for receiving various pieces of information or commands from a user. For example, the key button 102 can be disposed on the front surface of the 3D pointing device 10, as shown in FIG. 2a.

The memory 103 stores a specific program for controlling an overall operation of the 3D pointing device 10. The memory 103 stores data, which is input/output when the overall operation of the 3D pointing device 10 is executed by the controller 105, various processed data, and so on temporarily or permanently.

The transmission unit 104 transmits information about motion sensed by the sensor 101, or signals input through the key button 102 to the DTV 20.

The controller 105 controls the constituent elements and is responsible for an overall operation of the 3D pointing device 10 in accordance with embodiments of this document.

Figure 3:
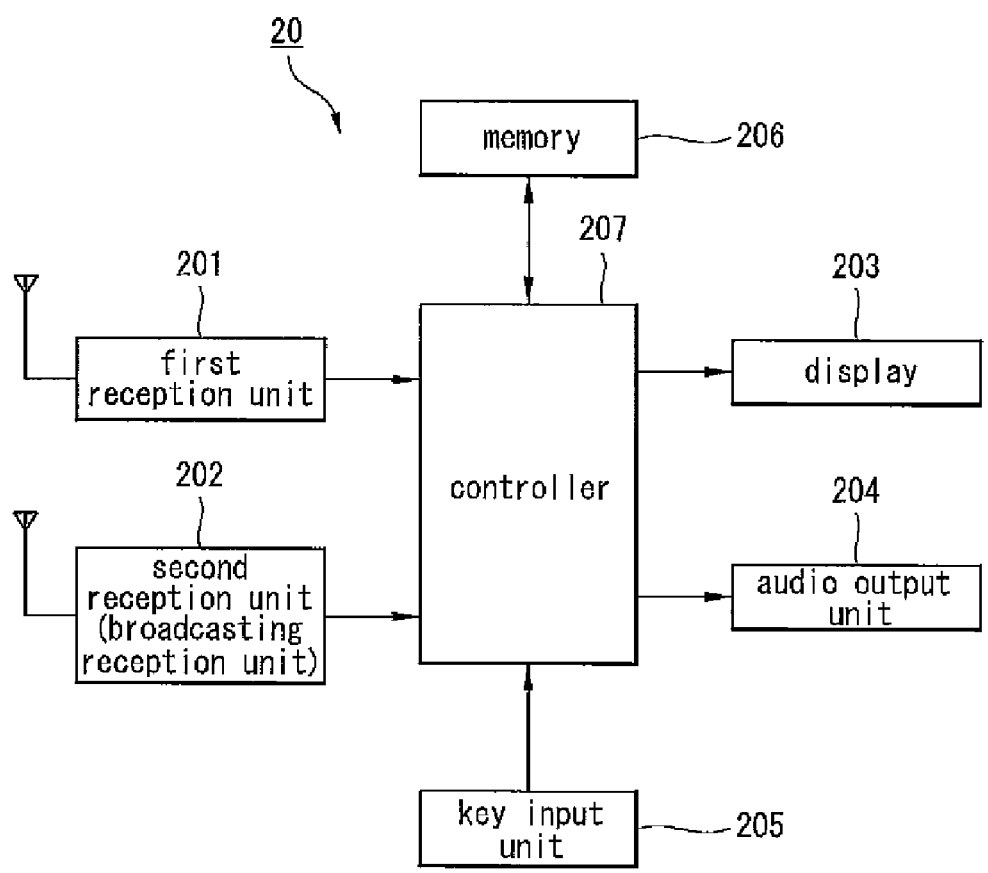
FIG. 3 is a block diagram showing the construction of DTV 20 in accordance with an embodiment of this document.

FIG. 3 is a block diagram showing the construction of the DTV 20 in accordance with an embodiment of this document. The DTV in accordance with an embodiment of this document is described in detail below with reference to FIG. 3.

The DTV 20 can comprise a first reception unit 201, a second reception unit 202, a display 203, an audio output unit 204, a key input unit 205, memory 206, and a controller 207.

The first reception unit 201 receives signals from the 3D pointing device 10. The first reception unit 201 and the 3D pointing device 10 can communicate with each other according to a radio frequency (RF) communication method.

The second reception unit 202 receives broadcasting signals from the broadcasting station 30. The broadcasting signals can comprise at least one of audio signals and video signals. Further, the broadcasting signals can comprise data broadcasting having text information.

The display 203 displays video information in response to a control signal output from the controller 207. For example, the video information can comprise video signals, comprised in broadcasting signals received through the second reception unit 202, a variety of graphic user interfaces (GUIs) provided by the DTV 20 or information indicating the status of the DTV 20.

The audio output unit 204 is an apparatus for outputting audio information. The audio output unit 204 can comprise a speaker.

The key input unit 205 is an apparatus for receiving various pieces of information or commands from a user. For example, the key input unit 205 can be disposed on the front or side of the DTV 20.

The memory 206 stores a specific program for controlling an overall operation of the DTV 20. The memory 206 can store data, which is input/output when the overall operation of the DTV 20 is executed by the controller 207, various processed data, and so on temporarily or permanently.

The DTV 20 can comprise, other than the above constituent elements, an apparatus that can connect to the Internet 40, and audio/video (A/V) decoding means for decoding A/V signals received from the broadcasting station 30 or the Internet 40. The A/V decoding means can be software processing means, or hardware processing means such as an additional multimedia chip.

The controller 207 controls the constituent elements and is responsible for an overall operation of the DTV 20 in accordance with embodiments of this document.

In this document, the DTV 20 performs functions in response to signals received from the 3D pointing device 10. Information included in the signals, which are transmitted from the 3D pointing device 10 to the DTV 20, may be various.

For example, the 3D pointing device 10 can transmit information itself about 3D motion of the 3D pointing device 10 to the DTV 20. Here, the DTV 20 processes information about 3D motion of the 3D pointing device 10 and performs functions.

For example, the 3D pointing device 10 can process information about 3D motion thereof and transmit information about commands for executing functions, provided by the DTV 20, to the DTV 20. Here, the DTV 10 may not receive information itself about the 3D motion of the 3D pointing device 10.

For example, the 3D pointing device 10 can transmit information about 3D motion of the 3D pointing device 10 and partially processed information of the information about the 3D motion to the DTV 20. Here, the DTV 10 can process the remaining information necessary to perform embodiments of this document.

Hereinafter, a concrete operation of the DTV in accordance with embodiments of this document and a method of executing functions of DTV by employing the 3D pointing device in accordance with embodiments of this document are described in detail below.

Figure 4:
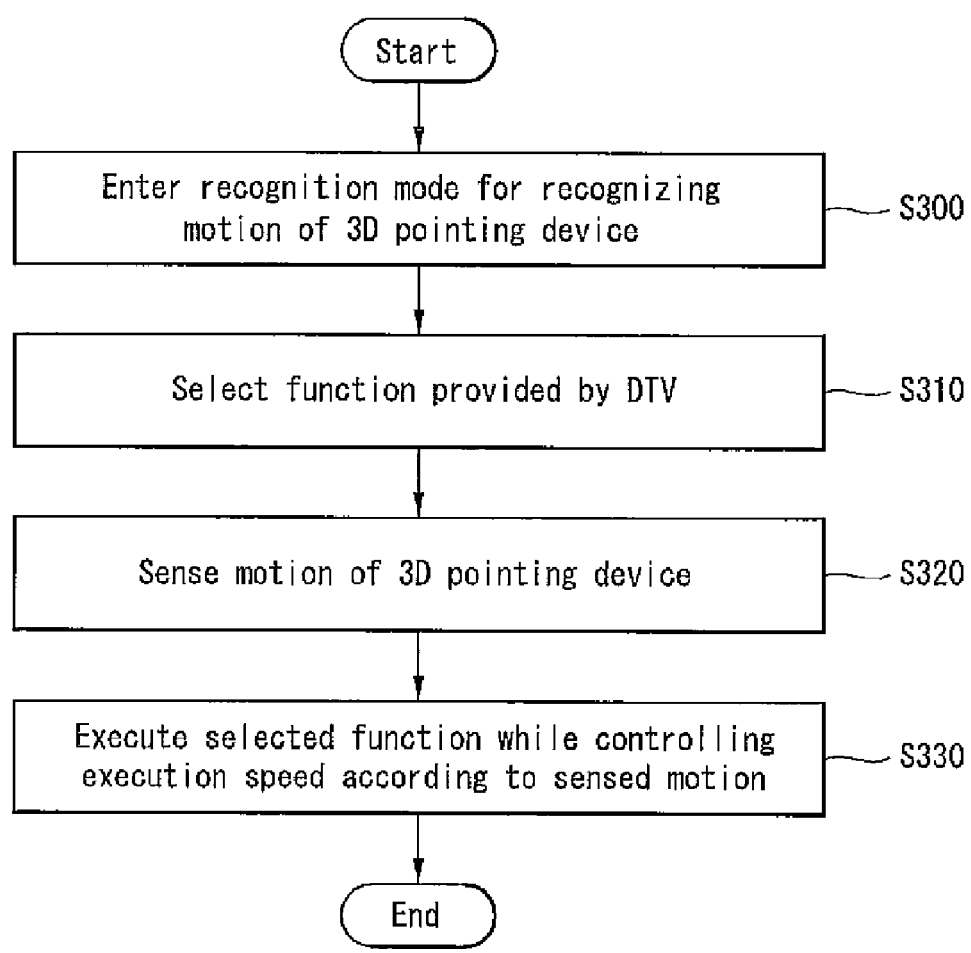
FIG. 4 is a flowchart illustrating a method of executing functions of DTV by employing the 3D pointing device in accordance with a first embodiment of this document.

FIG. 4 is a flowchart illustrating a method of executing functions of DTV by employing the 3D pointing device in accordance with a first embodiment of this document. The method of executing functions of DTV employing the 3D pointing device in accordance with a first embodiment of this document can be implemented in the system and the DTV 20 above described with reference to FIGS. 1 and 3. The method of executing functions of DTV by employing the 3D pointing device in accordance with a first embodiment of this document and an operation of the DTV 20 for implementing the method are described in detail below with reference to FIG. 4 and pertinent drawings.

A recognition mode for recognizing motion of the 3D pointing device 10 is entered [S300].

The step S300 can be performed by a user who manipulates the 3D pointing device 10. The 3D pointing device 10 can comprise an additional button for entering the recognition mode. When a user presses the button, the 3D pointing device 10 and the DTV 20 enter the recognition mode. In response thereto, the 3D pointing device 10 and the DTV 20 can recognize motion of the 3D pointing device 10.

Alternatively, the step S300 can be performed by a user who presses the button 205 provided in the DTV 20. For example, although the 3D pointing device 10 senses its motion and transmits a sensed signal to the DTV 20, if the DTV 20 does not receive the sensed signal or disregards the sensed signal, the 3D pointing device 10 cannot enter the recognition mode.

A function provided by the DTV 20 is selected [S310]. Functions provided by the DTV 20 in this document can comprise all functions, which can be executed by consecutive inputs according to motion of the 3D pointing device 10. The functions provided by the DTV 20 can also comprise all functions for controlling the output state of information. Further, the functions provided by the DTV 20 can comprise all functions whose values may be changed when being recognized by a user.

For example, the functions provided by the DTV 20 can comprise a function of controlling audio properties, such as volume control, tone (sound quality, tone quality, timbre, balance, bass, treble etc.) control or equalizer control.

As another example, the functions provided by the DTV 20 can comprise a function of controlling video properties. Such control of the video properties refers to control of the picture quality, such as brightness, contrast, tint, color, saturation, sharpness, resolution, etc.

As still another example, the functions provided by the DTV 20 can comprise a channel change function, a screen scroll function, and so on. For example, in the case in which the DTV 20 is connected to a web page through the Internet and information provided by the connected web page cannot be displayed on one screen, the DTV 20 can provide the screen scroll function.

The step S310 can be executed when the button, provided in the 3D pointing device 10 or the DTV 20 and matching a specific function, is pressed. Meanwhile, in the case in which the specific function matches a specific motion of the 3D pointing device 10, a user can select the specific function by moving the 3D pointing device 10 according to the matching.

When the 3D pointing device 10 and the DTV 20 enter the recognition mode, the controller 207 receives a radio signal from the 3D pointing device 10 through the first reception unit 201 and senses the motion of the 3D pointing device 10 [S320]. The controller 207 executes the selected function while controlling an execution speed of the function selected in the step S300 according to the degree of the motion of the 3D pointing device 10, which is sensed in the step S320 [S330].

Figure 5:
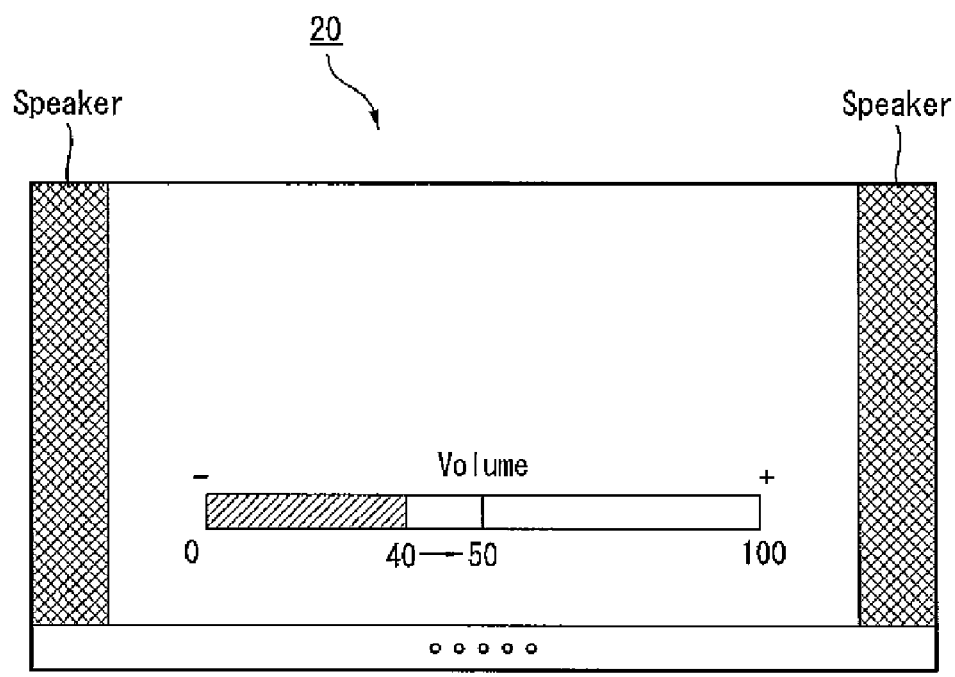
FIG. 5 is a diagram illustrating the concept of an execution speed.
Figure 5:
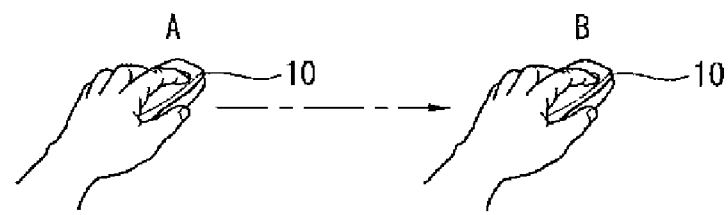

The execution speed refers to a speed that responds to motion of the 3D pointing device 10 when the DTV 20 executes the selected function. FIG. 5 is a diagram illustrating the concept of an execution speed. Referring to FIG. 5, when the 3D pointing device 10 moves from a point A to a point B, the controller 207 gradually changes the audio volume from 40 to 50. The execution speed refers to a change amount of the audio volume with respect to the motion of the 3D pointing device 10 from the point A to the point B. The execution speed may be constant or variable while the audio volume changes from 40 to 50.

The controller 207 can control the execution speed by considering at least one of the selected function itself, the distance of the sensed motion, and the speed of the sensed motion. For example, the controller 207 can increase the execution speed gradually as the distance of the sensed motion increases, while executing the selected function according to a default execution speed with respect to the selected function. For example, the controller 207 can increase the execution speed when the speed of the sensed motion is fast, but decrease the execution speed when the speed of the sensed motion is slow.

Figure 6:
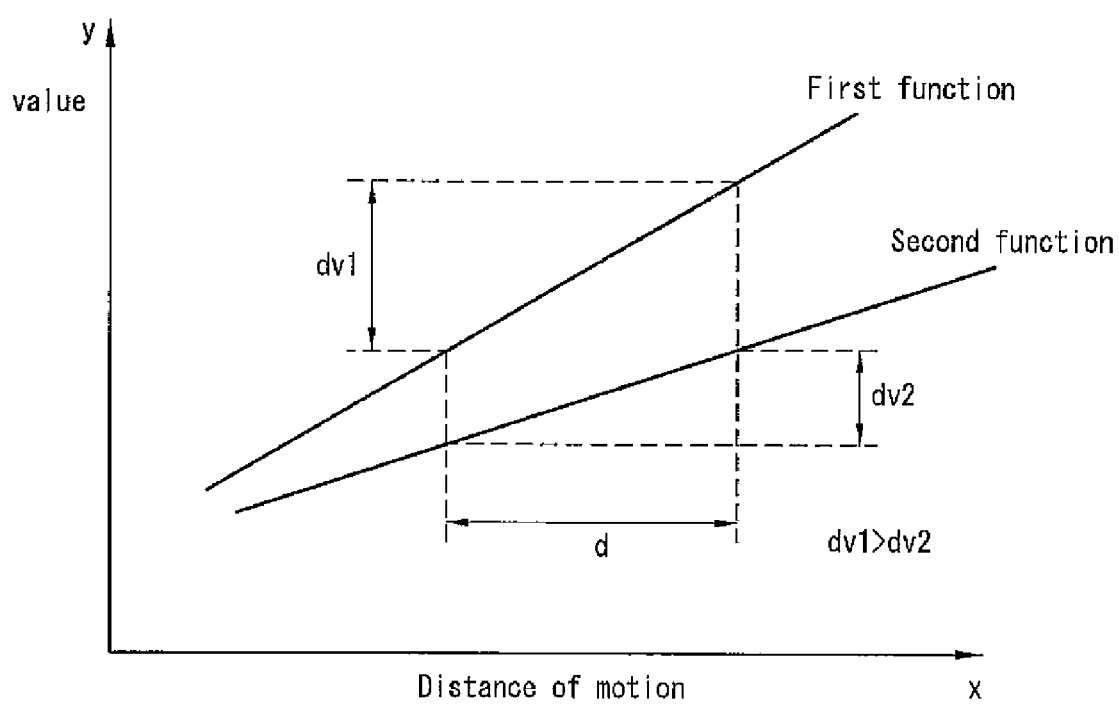
FIGS. 6 and 7 are diagrams illustrating a difference in the execution speed according to functions.
Figure 7:
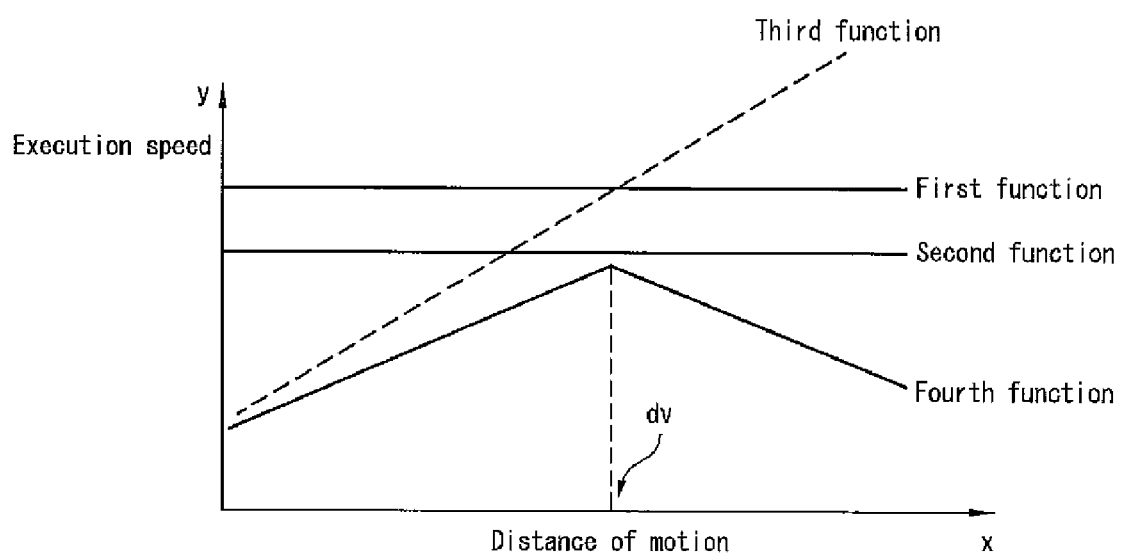

FIGS. 6 and 7 are diagrams illustrating a difference in the execution speed according to functions. In FIGS. 6 and 7, the x axis denotes a distance where the 3D pointing device 10 has moved and the y axis denotes a value pertinent to a function. For example, the y axis can denote the audio volume.

As shown in FIG. 6, a first function and a second function can have different execution speeds. For example, in FIG. 6, in the case in which the 3D pointing device 10 has moved 'd', the first function can be executed as much as a value corresponding to dV1 can be changed, and the second function can be executed as much as a value corresponding to dV2. As described above, the first function and the second function have different execution speeds with respect to the motion of the 3D pointing device 10. Further, in FIG. 6, although the 3D pointing device 10 moves the same distance, the change amount of a value regarding the first function is greater than the change amount of a value regarding the second function.

FIG. 7 is a diagram illustrating an execution speed that varies according to the distance of motion of the 3D pointing device 10. Referring to FIG. 7, while the 3D pointing device 10 moves, the execution speeds of a first function and a second function are constant. In the case of a third function, as a motion distance of the 3D pointing device 10 increases, the execution speed of the third function gradually increases. Further, in the case of a fourth function, when the 3D pointing device 10 moves up to a distance dv, the execution speed of the fourth function gradually increases, but when the 3D pointing device 10 moves a distance exceeding the distance dv, the execution speed of the fourth function gradually decreases.

The controller 207 can also control the execution speed in consideration of a current value regarding the selected function.

Figure 8:
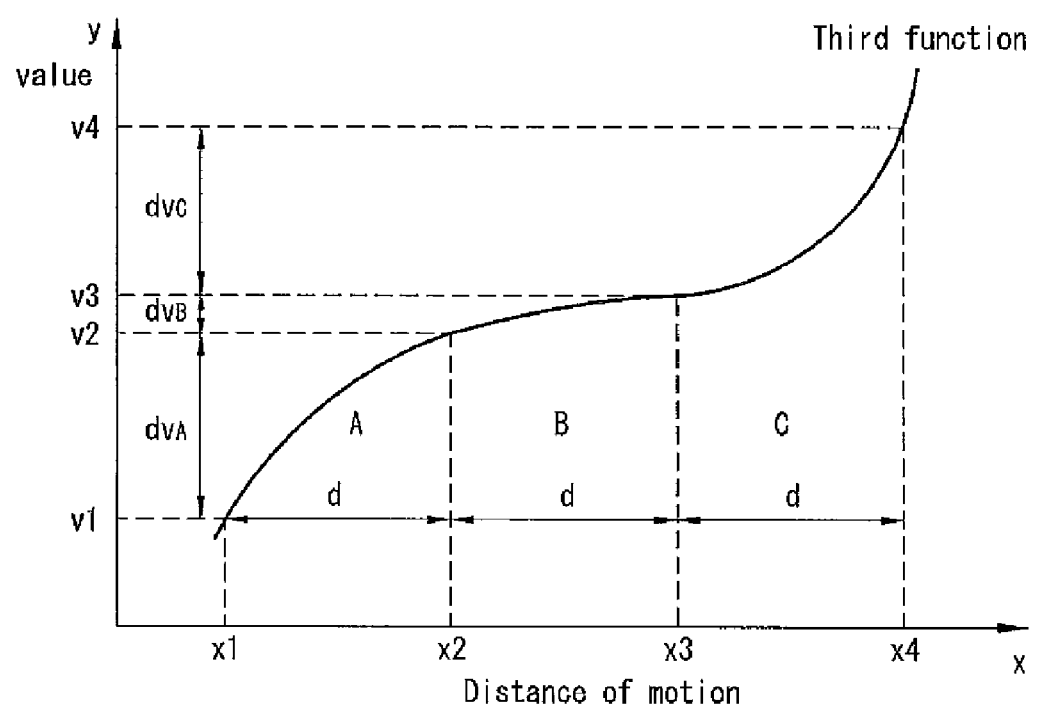
FIG. 8 is a graph showing an example in which the execution speed of a function is varied while the 3D pointing device 10 is moved.

FIG. 8 is a graph showing an example in which the execution speed of a function is varied while the 3D pointing device 10 is moved. For example, while the 3D pointing device 10 moves, the controller 207 can control the execution speed of the selected function in consideration of a current value and the distance of motion with respect to the selected function. In FIG. 8, it is assumed that the 3D pointing device 10 consecutively moves a distance, corresponding to 3d, from $x_1$ to $x_4$ and the y axis denotes the audio volume.

While the 3D pointing device 10 consecutively moves the distance, corresponding to 3d, from $x_1$ to $x_4$, the audio volume changes from $V_1$ to $V_4$ while the speed of the audio volume vanes, as shown in FIG. 8. For example, when the 3D pointing device 10 moves the distance d from $x_1$ to $x_2$, the audio volume changes from $V_1$ to $V_2$. When the 3D pointing device 10 continues to move to reach $x_3$, the audio volume changes up to $V_3$. Here, when comparing with a section A and a section B, the 3D pointing device 10 has moved the same distance d, but the change amounts of the audio volume are different from each other ($dV_A > dV_B$).

Referring to FIG. 8, the controller 207 can control the change speed of the audio volume in consideration of a current value of the audio volume as the 3D pointing device 10 moves.

An increment and decrement of a value with respect to the selected function may be previously set according to the direction of motion of the 3D pointing device 10. Here, the controller 207 can control the execution speed in consideration of the direction of the sensed motion.

Figure 9:
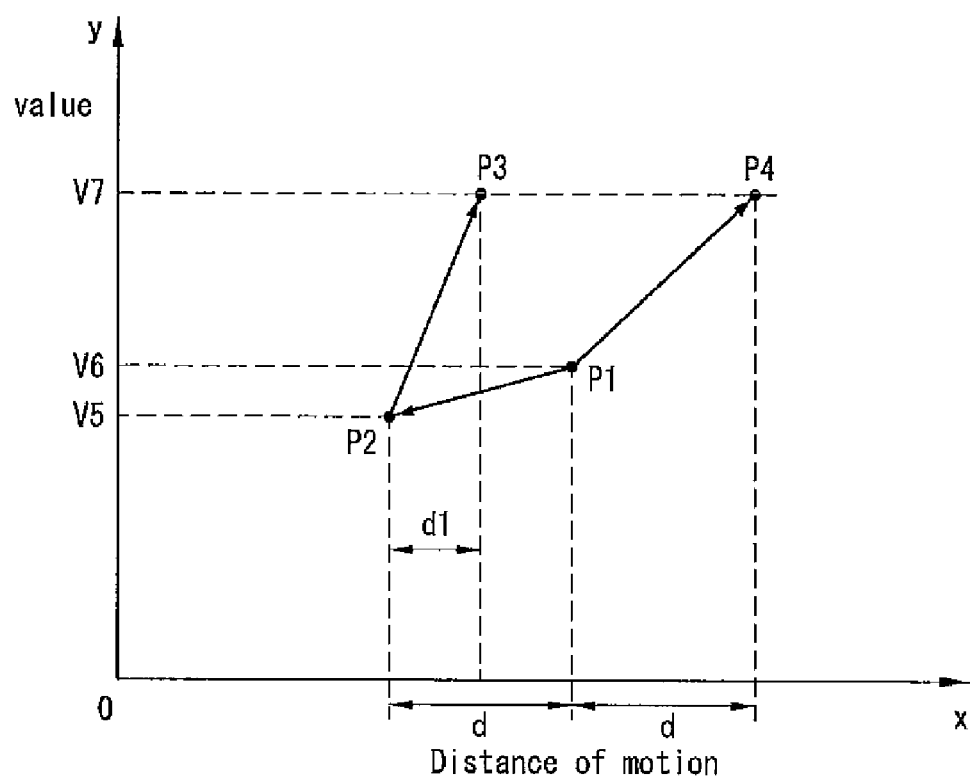
FIG. 9 is a diagram illustrating a change in the execution speed depending on a motion direction of the 3D pointing device 10.

FIG. 9 is a diagram illustrating a change in the execution speed depending on a motion direction of the 3D pointing device 10. It is assumed that when the 3D pointing device 10 moves to the right, a value with respect to the selected function increases and when the 3D pointing device 10 moves to the left, a value with respect to the selected function decreases.

For example, referring to FIG. 9, in the case in which a user moves the 3D pointing device 10 to the left from a point $P_1$ to a point $P_2$ by a distance d, the audio volume decreases from $V_6$ to $V_5$. In the case in which a user moves the 3D pointing device 10 to the right from the point $P_1$ to a point $P_4$ by a distance d, the audio volume increases from $V_6$ to $V_7$. As shown in FIG. 9, when a user moves the 3D pointing device 10 from the point $P_1$ to the left and when a user moves the 3D pointing device 10 from the point $P_1$ to the right by the same distance, the change amounts of the audio volume can differ. FIG. 9 shows an example in which when the 3D pointing device 10 moves to the right rather than when the 3D pointing device 10 moves to the left, the change amount of the audio volume with respect to the distance of motion of the 3D pointing device 10 is great, that is, the execution speed of the volume control function is fast.

The controller 207 can control the change speed of the audio volume in consideration of a current value of the audio volume as described above. In FIG. 9, in the case in which a current value of the audio volume is $V_5$ (the point $P_2$), when a user moves the 3D pointing device 10 to the right by the distance $d_1$, the audio volume can change to $V_7$. When a current value of the audio volume is $V_6$ (the point $P_1$), a user can change the audio volume up to $V_7$ by moving the 3D pointing device 10 to the right by the distance d greater than the distance $d_1$.

The execution speed can be set by a user. For example, a user can set an execution speed with respect to a specific function by employing a GUI provided by the DTV 20. Further, a user can set an execution speed with respect to a specific function in various ways. Here, the DTV 20 can provide a user with various options for setting an execution speed with respect to a specific function through a GUI. For example, a user can set an execution speed with respect to a specific function constantly, or set an execution speed with respect to a specific function every section of a value regarding the specific function. Further, a user can set an execution speed with respect to a specific function to be dependent or independent on a motion speed of the 3D pointing device 20. That is, the execution profiles may be pre-set, or may be set or selected by a user. For example, a first user may prefer a highly sensitive volume control profile. This user would set or select a profile that has a high slope. A second user may prefer a less sensitive volume control profile. This user would set or select a profile that has a lower slope. The setting or selection of a profile may be executed via one or more help screens or on-screen prompts.

Thus, with the present invention, various execution profiles may be used for various functions. The profiles include an execution speed that is dependent on at least one of the direction, speed and acceleration of the 3D pointing device. Execution profiles of different functions may be the same or may be different.

Also, the execution profiles may be linear or non-linear. A non-linear profile may include a first portion that has a first (e.g., high) slope, and a second portion that has a second (e.g., small) slope. Alternatively, there may be three slopes, with the first and third having a first (e.g., high) slope, and the second having a second (e.g., small) slope.

Figure 10:
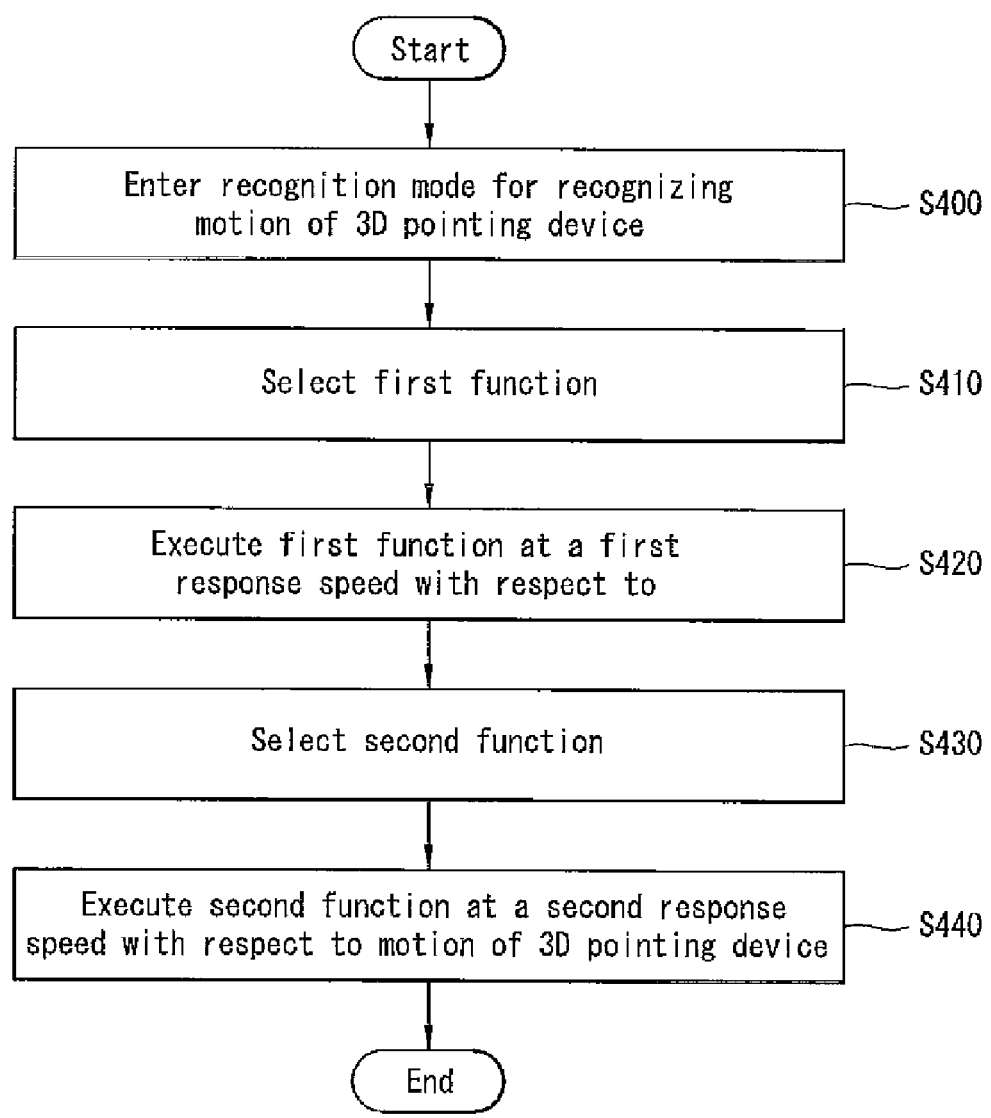
FIG. 10 is a flowchart illustrating a method of executing functions of DTV by employing the 3D pointing device in accordance with a second embodiment of this document.

FIG. 10 is a flowchart illustrating a method of executing functions of DTV by employing the 3D pointing device in accordance with a second embodiment of this document. The method of executing functions of DTV by employing the 3D pointing device in accordance with a second embodiment of this document can be implemented in the system and the DTV 20 described with reference to FIGS. 1 and 3. The method of executing functions of DTV by employing the 3D pointing device in accordance with a second embodiment of this document and an operation of the DTV 20 for implementing the method are described in detail with reference to FIG. 10 and pertinent drawings.

A recognition mode for recognizing motion of the 3D pointing device 10 is entered [S400]. The step S400 corresponds to the step S300 of FIG. 4.

When a first function provided by the DTV 20 is selected [S410], the controller 207 executes the first function at a first response speed with respect to the motion of the 3D pointing device 10 [S420]. The first response speed with respect to the first function is previously set.

If a second function provided by the DTV 20 is selected while the step S410 is being executed [S430], the controller 207 executes the second function at a second response speed with respect to the motion of the 3D pointing device 10 [S440]. The second response speed with respect to the second function is previously set. The second response speed may differ from the first response speed.

From FIGS. 6 to 8, it can be seen that when a function selected by a user changes, a response speed with respect to motion of the 3D pointing device 10 changes. For example, the first and second response speeds may have different values although at least one of the distance of motion of the 3D pointing device, the speed of the motion of the 3D pointing device, and the direction of the motion of the 3D pointing device is identical. Response speeds with respect to the distance of motion, the speed of motion, and the direction of motion of the 3D pointing device have already been described above in connection with the first embodiment of this document, and further description thereof is omitted.

The first and second response speeds can be decided in consideration of at least one of a corresponding function itself, and a current value with respect to the corresponding function. This also has been described above in connection with the first embodiment of this document, and further description thereof is omitted.

The first and second response speeds can be set by a user in the same manner as the first embodiment of this document.

Figure 11:
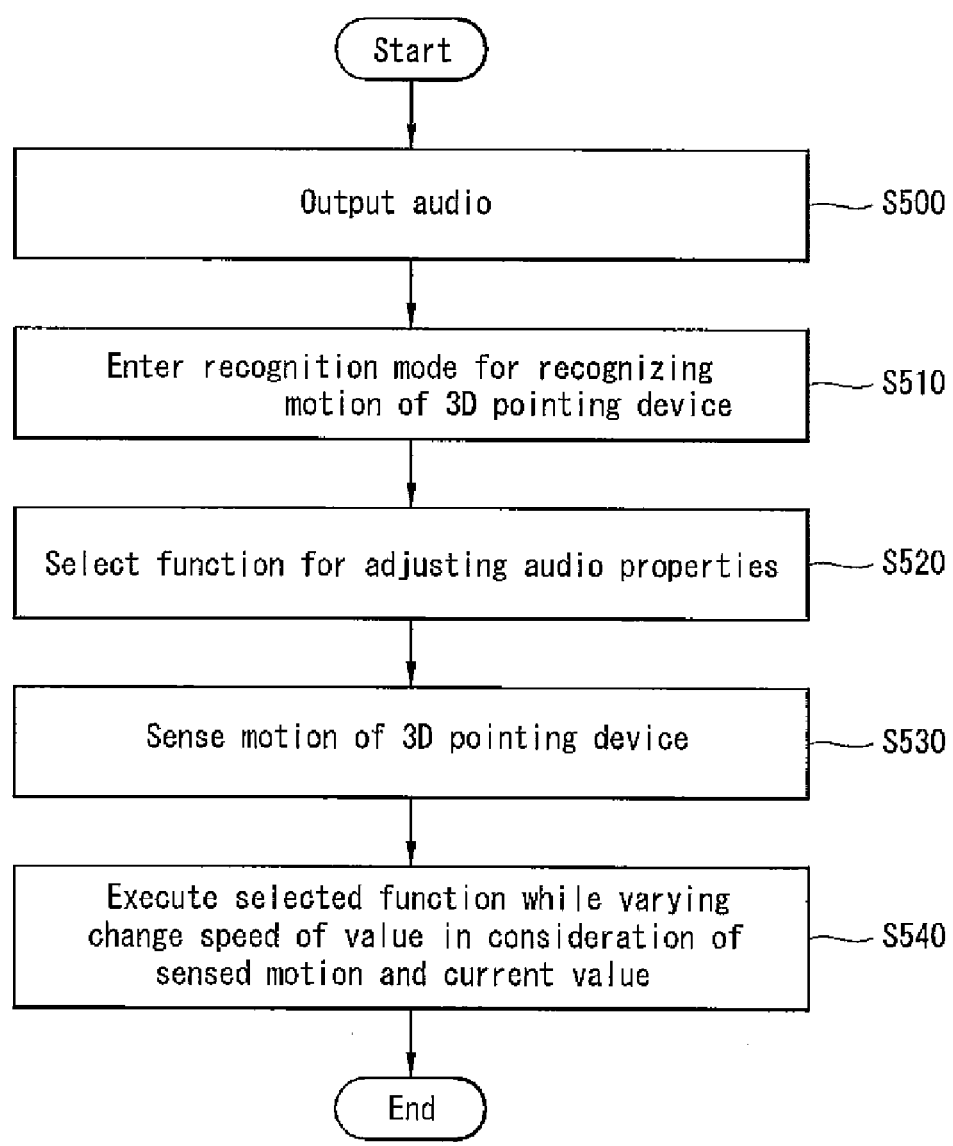
FIG. 11 is a flowchart illustrating a method of executing functions of DTV employing the 3D pointing device in accordance with a third embodiment of this document.

FIG. 11 is a flowchart illustrating a method of executing functions of DTV employing the 3D pointing device in accordance with a third embodiment of this document. The method of executing functions of DTV employing the 3D pointing device in accordance with a third embodiment of this document can be implemented in the system and the DTV 20 described with reference to FIGS. 1 and 3. The method of executing functions of DTV employing the 3D pointing device in accordance with a third embodiment of this document and an operation of the DTV 20 for implementing the method are described in detail with reference to FIG. 11 and pertinent drawings.

The controller 207 outputs audio through the audio output unit 204 [S500]. For example, the controller 207 can output A/V broadcasting, which is received through the second reception unit 202, through the audio output unit 204 while displaying the A/V broadcasting through the display 203. For example, when the DTV 20 is equipped with an apparatus accessible by an Internet, the controller 207 can output audio, received over the Internet, through the audio output unit 204.

A recognition mode for recognizing motion of the 3D pointing device 10 is entered [S510]. The step S510 corresponds to the step S300 of FIG. 4.

A specific one of one or more functions for adjusting the audio properties is selected [S520]. The step S520 can be performed in various ways, as described above in connection with the step S310. For example, the specific function selected in the step S520 can be a volume control function or a tone control function.

The controller 207 receives a radio signal from the 3D pointing device 10 through the first reception unit 201 and senses motion of the 3D pointing device 10 [S530].

The controller 207 executes the specific function, while varying a change speed of a value with respect to the specific function, in consideration of the sensed motion of the 3D pointing device 10 and a current value regarding the selected specific function [S540].

In the step S540, the controller 207 can vary the change speed of the value regarding the specific function according to the direction of the sensed motion. An increment and decrement of the value regarding the specific function depending on the direction of the sensed motion may be previously set.

The change speed of the value regarding the specific function can be set by a user in the same manner as the above first or second embodiment of this document.

The method of executing functions of DTV by employing the 3D pointing device and the method of adjusting the audio properties of DTV by employing the 3D pointing device in accordance with this document, which have been described above, can be recorded into a computer-readable recording medium as a program for being executed by a computer and then provided.

The method of executing functions of DTV by employing the 3D pointing device and the method of adjusting the audio properties of DTV by employing the 3D pointing device in accordance with this document can be executed through a software program. When the method is executed through a software program, the constituting elements of this document become code segments that execute a specific task. The program or code segments can be stored in a processor-readable medium or transmitted through computer data signals combined with carrier in a transmission medium or a communication network.

The computer-readable recording medium can comprise all kinds of recording devices in which data readable by a computer system is stored. For example, the computer-readable recording medium can comprise ROM, RAM, CD-ROM, DVD±ROM, magnetic tapes, floppy disks, hard disks, optical data storages, and so on. Further, the computer-readable recording medium can be distributed into computer systems connected over a network, so codes readable by a computer can be stored and executed in a distributed manner.

While this document has been described in connection with what is presently considered to be practical exemplary embodiments, it is to be understood that this document is not limited to the disclosed embodiments, but, on the contrary, is intended to cover various modifications and equivalent arrangements included within the spirit and scope of the appended claims.

The DTV that is able to receive signals from the 3D pointing device, the method of executing functions of DTV by employing the 3D pointing device, and the method of adjusting the audio properties of DTV by employing the 3D pointing device in accordance with this document have the following advantages.

First, in accordance with this document, in executing a function of the DTV according to motion of the 3D pointing device, an execution speed of the DTV function is varied according to the degree of motion of the 3D pointing device. Accordingly, a user can use the 3D pointing device efficiently and conveniently in various environments or situations.

Second, in accordance with this document, when executing a function of the DTV by employing the 3D pointing device, fine control is possible according to a current value or a current section of the function. For example, although a user greatly moves the 3D pointing device, an execution speed of the function can be set slowly. For example, although a user moves the 3D pointing device only a little, an execution speed of the function can be set fast.

Third, in accordance with this document, a user can set a response speed of the DTV with respect to the 3D pointing device, as needed.

What is claimed is:

1. A method of executing functions of digital television (DTV) with a three-dimensional (3D) pointing device, the method comprising:

selecting by the DTV one of a plurality of functions provided by the DTV in response to a selection signal received from the 3D pointing device, each function having a corresponding execution profile;

receiving by the DTV a motion parameter sensed by the 3D pointing device, the motion parameter including a direction of continuous movement of the 3D pointing device and a distance corresponding to the direction of continuous movement; and executing the selected function by the DTV in accordance with the corresponding execution profile and the received motion parameter, wherein the corresponding execution profile includes a correspondence between a rate of change of an execution speed of the selected function and a change of the distance corresponding to the direction of continuous movement, wherein the distance of continuous movement comprises a plurality of sections having a common length, wherein the rate of change of the execution speed includes plural rates of change corresponding to the plurality of sections, and wherein each of the plural rates of change are different from each other.

2. The method of claim 1, wherein the step of executing the selected function comprises:

gradually increasing or decreasing the rate of change of the execution speed of the selected function in proportion to the distance of continuous movement.

3. The method of claim 1, wherein the step of executing the selected function comprises:

adjusting a current value associated with the selected function to a corresponding new value with the execution speed corresponding to the execution profile and the received motion parameter.

4. The method of claim 3, wherein the step of adjusting a current value associated with the selected function to a corresponding new value comprises at least one of:
controlling the execution speed according to the distance corresponding to the direction of continuous movement of the 3D pointing device, and
adjusting the current value with one of a predetermined increment and decrement according to the direction of continuous movement of the 3D pointing device.

5. The method of claim 1, wherein the step of executing the selected function by the DTV comprises one of:
controlling an audio quality parameter of the DTV as the selected function; and
controlling a picture quality parameter of the DTV as the selected function.

6. The method of claim 1, further comprising:
setting the execution speed in response to a command input by a user.

7. The method of claim 1, wherein the execution profile is a first execution profile, the method further comprising:
selecting by the DTV a second of the plurality of functions provided by the DTV in response to a second selection signal received from the 3D pointing device, the second function having a corresponding second execution profile;
receiving a second signal from the 3D pointing device, the second signal corresponding to a second motion parameter sensed by the 3D pointing device and including a second direction of continuous movement of the 3D pointing device and a second distance corresponding to the second direction; and
executing by the DTV the selected second function in accordance with the corresponding second execution profile and the received second motion parameter.

8. The method of claim 7, wherein the step of executing the selected second function comprises:
gradually increasing or decreasing the rate of the change of a second execution speed of the selected second function in proportion to the second distance.

9. The method of claim 7, wherein the first and second execution profiles are different.

10. The method of claim 7, wherein the first and second execution profiles are the same.

11. The method of claim 7, wherein at least one of the first and second execution profiles are linear.

12. The method of claim 7, wherein at least one of the first and second execution profiles are non-linear.

13. A method of executing functions of digital television (DTV) with a three-dimensional (3D) pointing device, the method comprising:
transmitting a selection signal from the 3D pointing device to the DTV to select one of a plurality of functions provided by the DTV, each function having a corresponding execution profile;
sensing within the 3D pointing device a motion of the 3D pointing device and generating a corresponding motion parameter, the motion parameter including a direction of continuous movement of the 3D pointing device and a distance corresponding to the direction of continuous movement; and
transmitting the motion parameter to the DTV to execute the selected function in accordance with the corresponding execution profile and the sensed motion parameter,
wherein the corresponding execution profile includes a correspondence between a rate of change of an execution speed of the selected function and a change of the distance corresponding to the direction of continuous movement,
wherein the distance of continuous movement comprises a plurality of sections having a common length,
wherein the rate of change of the execution speed includes plural rates of change corresponding to the plurality of sections, and
wherein each of the plural rates of change are different from each other.

14. The method of claim 13, further comprising:
transmitting a second selection signal from the 3D pointing device to the DTV to select a second of the plurality of functions provided by the DTV;
sensing within the 3D pointing device a second motion of the 3D pointing device and generating a corresponding second motion parameter, the second motion parameter including a second direction of continuous movement of the 3D pointing device and one of a second distance and a second velocity corresponding to the second direction of continuous movement; and
transmitting the second motion parameter to the DTV to execute the selected second function in accordance with the corresponding second execution profile and the sensed second motion parameter.

15. A method of executing functions of digital television (DTV) with a three-dimensional (3D) pointing device, the method comprising:
transmitting a selection signal from the 3D pointing device to the DTV to select one of a plurality of functions provided by the DTV, each function having a corresponding execution profile;
receiving the selection signal in the DTV and selecting by the DTV the one of a plurality of functions in response to the selection signal;
sensing within the 3D pointing device a motion of the 3D pointing device and generating a corresponding motion parameter, the motion parameter including a direction of continuous movement of the 3D pointing device and a distance corresponding to the direction of continuous movement;
transmitting the motion parameter from the 3D pointing device to the DTV;
receiving the motion parameter in the DTV; and
executing the selected function by the DTV in accordance with the corresponding execution profile and the received motion parameter,
wherein the corresponding execution profile includes a correspondence between a rate of change of an execution speed of the selected function and a change of the distance corresponding to the direction of continuous movement,
wherein the distance of continuous movement comprises a plurality of sections having a common length,
wherein the rate of change of the execution speed includes plural rates of change corresponding to the plurality of sections, and
wherein each of the plural rates of change are different from each other.

16. A digital television (DTV) configured to be controlled by a remote three-dimensional (3D) pointing device, comprising:

a receiver configured to receive control signals from the 3D pointing device; and a control unit configured to select one of a plurality of functions provided by the DTV in response to a selection signal received from the 3D pointing device, each function having a corresponding execution profile, and execute the selected function in accordance with the corresponding execution profile and a motion parameter sensed by the 3D pointing device and received by the receiver, the motion parameter including a direction of continuous movement of the 3D pointing device and a distance corresponding to the direction of continuous movement, wherein the corresponding execution profile includes a correspondence between a rate of change of an execution speed of the selected function and a change of the distance corresponding to the direction of continuous movement, wherein the distance of continuous movement comprises a plurality of sections having a common length, wherein the rate of change of the execution speed includes plural rates of change corresponding to the plurality of sections, and wherein each of the plural rates of change are different from each other.

17. The DTV of claim 16, wherein the control unit is configured to gradually increase or decrease the rate of the execution speed of the selected function in proportion to the distance.

18. The DTV of claim 16, wherein the control unit is configured to adjust a current value associated with the selected function to a corresponding new value with the execution speed corresponding to the execution profile and the received motion parameter.

19. The DTV of claim 18, wherein the control unit is configured to control the execution speed according to the distance corresponding to the direction of continuous movement of the 3D pointing device.

20. The DTV of claim 18, wherein the control unit is configured to adjust the current value with one of a predetermined increment and decrement according to the direction of continuous movement of the 3D pointing device.

21. The DTV of claim 16, wherein the control unit is configured to control an audio quality parameter of the DTV as the selected function.

22. The DTV of claim 16, wherein the control unit is configured to control a picture quality parameter of the DTV as the selected function.

23. The DTV of claim 16, wherein the control unit is configured to set the execution speed in response to an input by a user.

24. The DTV of claim 16, wherein the execution profile is a first execution profile, the control unit is configured to select a second of the plurality of functions provided by the DTV in response to a second selection signal received from the 3D pointing device, the second function having a corresponding second execution profile, the receiver is configured to receive a second signal from the 3D pointing device, the second signal corresponding to a second motion parameter sensed by the 3D pointing device and including a second direction of continuous movement of the 3D pointing device and a second distance corresponding to the second direction of continuous movement, and the control unit is configured to execute the selected second function in accordance with the corresponding second execution profile and the received second motion parameter.

25. The DTV of claim 24, wherein the control unit is configured to gradually accelerate or decelerate a second execution speed of the selected second function in proportion to the second distance.

26. The DTV of claim 25, wherein the first and second execution profiles are different.

27. The DTV of claim 25, wherein the first and second execution profiles are the same.

28. The DTV of claim 25, wherein at least one of the first and second execution profiles are linear.

29. The DTV of claim 25, wherein at least one of the first and second execution profiles are non-linear.

30. A three-dimensional (3D) pointing device configured to control a remote digital television (DTV), comprising:

a transmitter configured to transmit control signals to the remote DTV, including a selection signal configured to select one of a plurality of functions provided by the DTV, each function having a corresponding execution profile; and a sensor configured to sense within the 3D pointing device a motion of the 3D pointing device and generate a corresponding motion parameter, the motion parameter including a direction of continuous movement of the 3D pointing device and a distance corresponding to the direction of continuous movement, wherein the transmitter is further configured to transmit the motion parameter to the DTV so as to execute the selected function in accordance with the corresponding execution profile and the sensed motion parameter, and wherein the corresponding execution profile includes a correspondence between a rate of change of an execution speed of the selected function and a change of the distance corresponding to the direction of continuous movement, wherein the distance of continuous movement comprises a plurality of sections having a common length, wherein the rate of change of the execution speed includes plural rates of change corresponding to the plurality of sections, and wherein each of the plural rates of change are different from each other.

31. A system, comprising:

a digital television (DTV); and a three-dimensional (3D) pointing device, wherein the DTV includes a receiver configured to receive control signals from the 3D pointing device; and a control unit configured to select one of a plurality of functions provided by the DTV in response to a selection signal received from the 3D pointing device, each function having a corresponding execution profile, and execute the selected function in accordance with the corresponding execution profile and a motion parameter sensed by the 3D pointing device and received by the receiver, the motion parameter including a direction of continuous movement of the 3D pointing device and a distance corresponding to the direction of continuous movement, wherein the corresponding execution profile includes a correspondence between a rate of change of an execution speed of the selected function and a change of the distance corresponding to the direction of continuous movement,
wherein the distance of continuous movement comprises a plurality of sections having a common length,
wherein the rate of change of the execution speed includes plural rates of change corresponding to the plurality of sections, and
wherein each of the plural rates of change are different from each other, and the 3D pointing device includes
a transmitter configured to transmit the control signals to the remote DTV, including the selection signal; and
a sensor configured to sense within the 3D pointing device the motion of the 3D pointing device and generate the corresponding motion parameter, and
wherein the transmitter is further configured to transmit the motion parameter to the DTV.

32. A method of executing functions of digital television (DTV) with a three-dimensional (3D) pointing device, the method comprising:
selecting, by the DTV, one of a plurality of functions provided by the DTV in response to a selection signal received from the 3D pointing device;
receiving, by the DTV, a motion parameter sensed by the 3D pointing device, the motion parameter including an information about continuous movement of the 3D pointing device,
wherein the information includes a direction of the continuous movement of the 3D pointing device and a distance corresponding to the direction of continuous movement; and
executing, by the DTV, the selected function in accordance with the received motion parameter while changing a value related to the selected function,
wherein a speed of change of the value is gradually accelerated or decelerated in proportion to the direction of continuous movement,
wherein the distance of continuous movement comprises a plurality of sections having a common length,
wherein the rate of change of the execution speed includes plural rates of change corresponding to the plurality of sections, and
wherein each of the plural rates of change are different from each other.

33. The method of claim 32, wherein as the distance corresponding to the direction of continuous movement increases, the speed of change of the value is gradually accelerated or decelerated.

* * * * *